Oct. 30, 1934.   M. R. ZECHLIN   1,978,927
BRAKE TESTING APPARATUS
Filed May 25, 1931   6 Sheets-Sheet 3

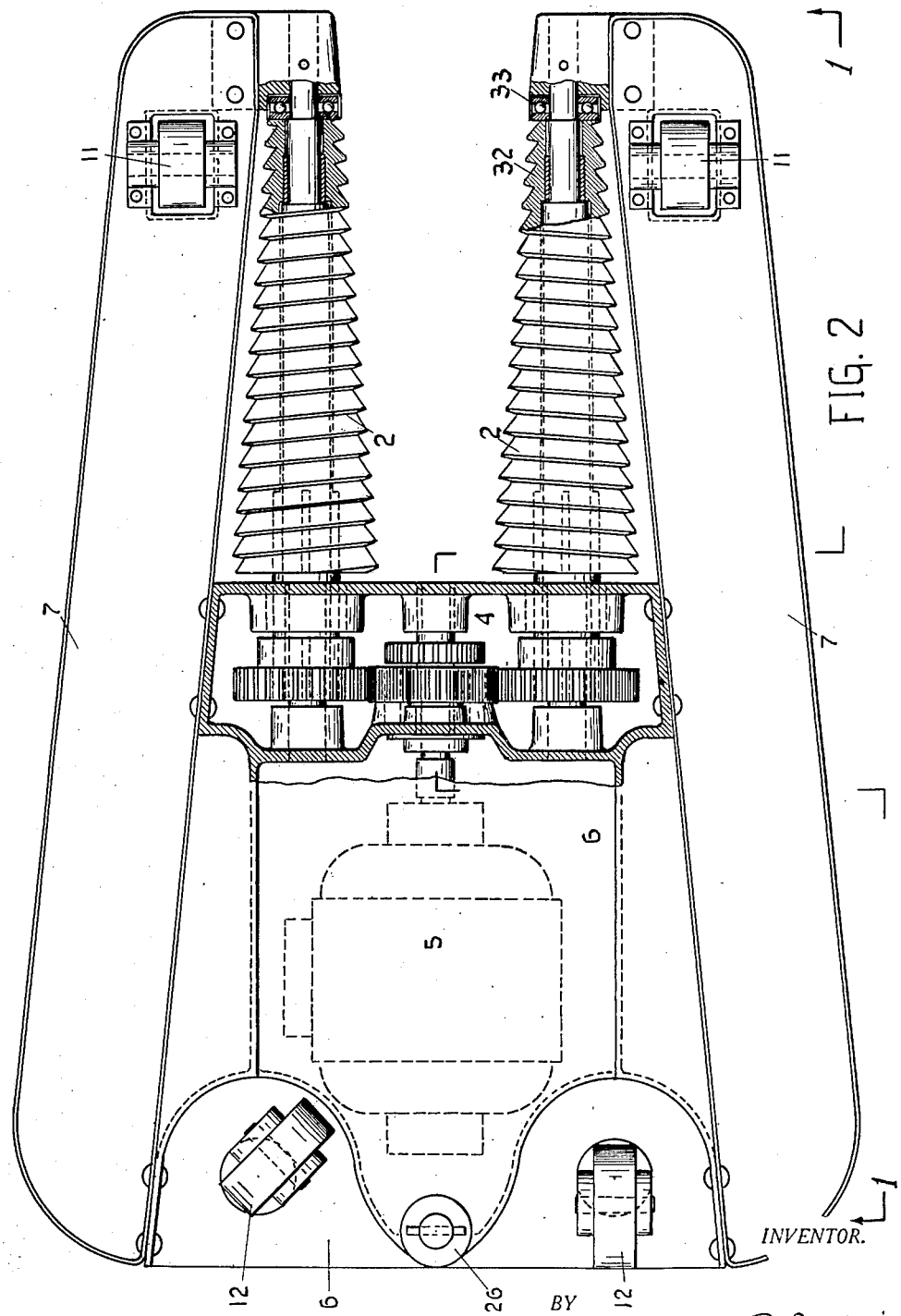

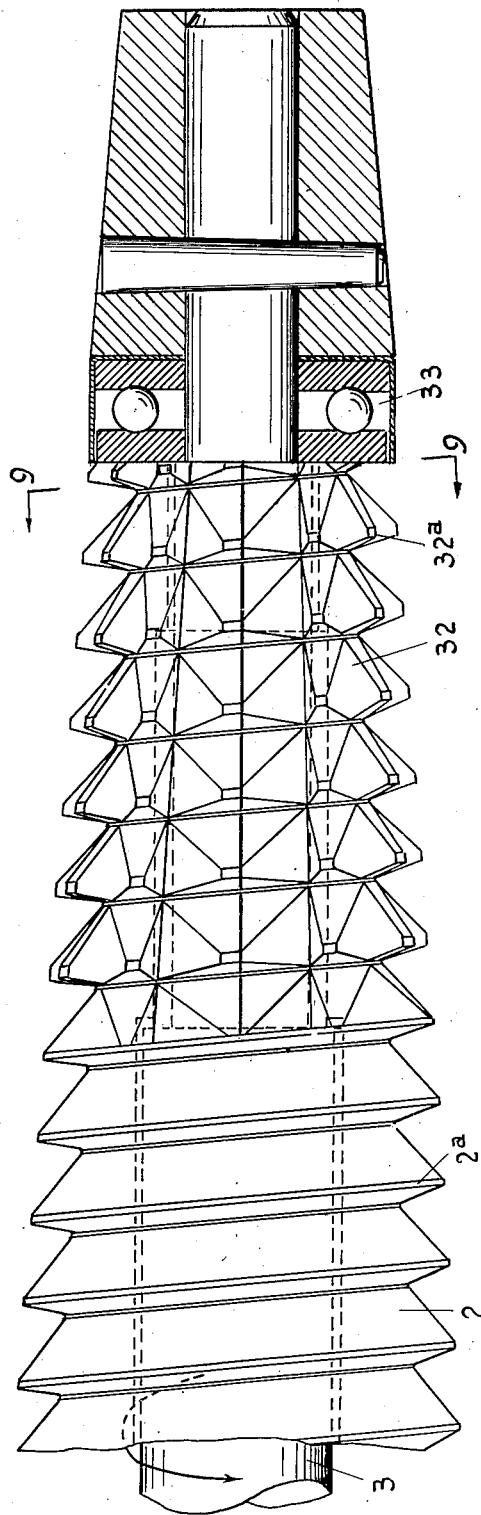
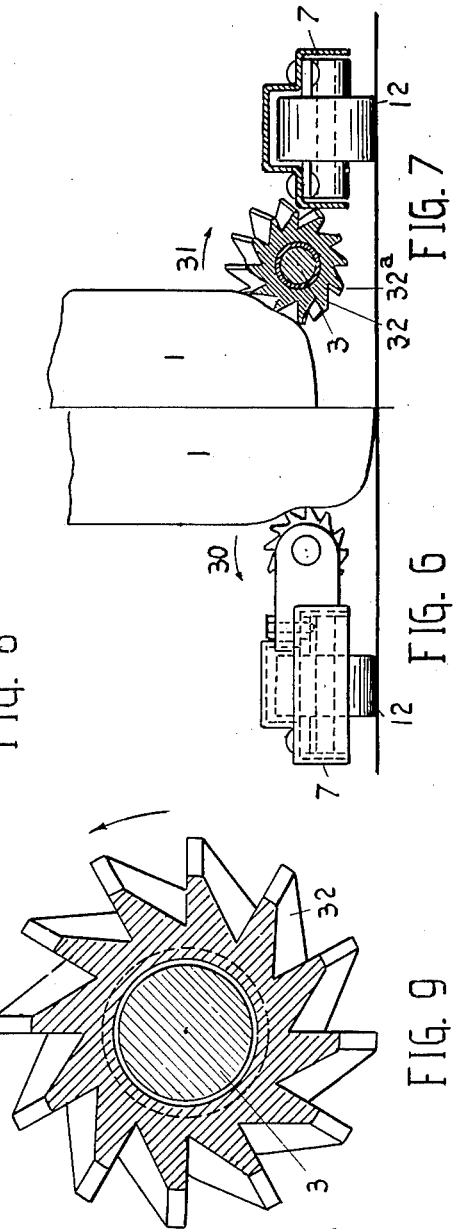

Oct. 30, 1934.    M. R. ZECHLIN    1,978,927
BRAKE TESTING APPARATUS
Filed May 25, 1931    6 Sheets-Sheet 5
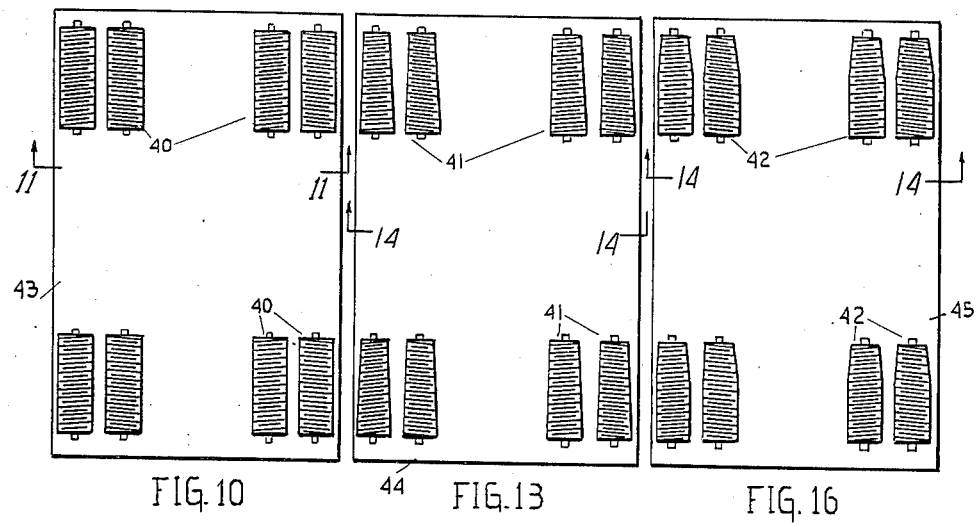
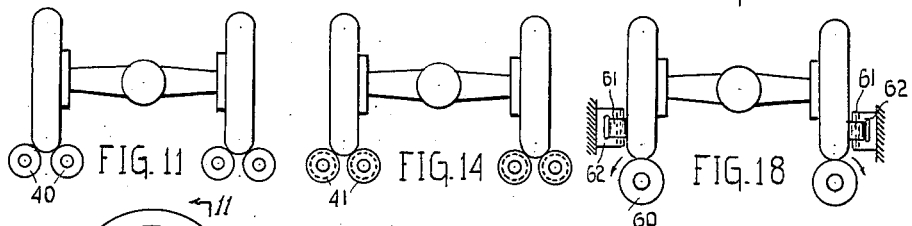
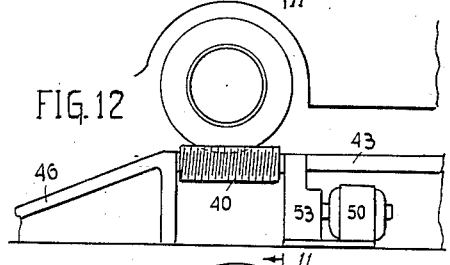
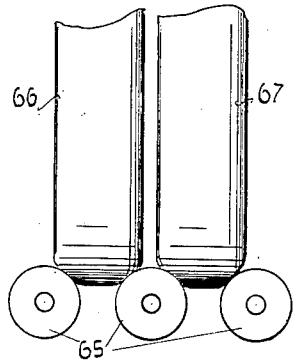
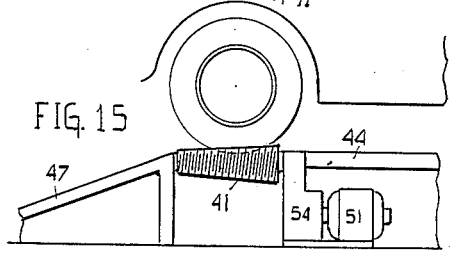
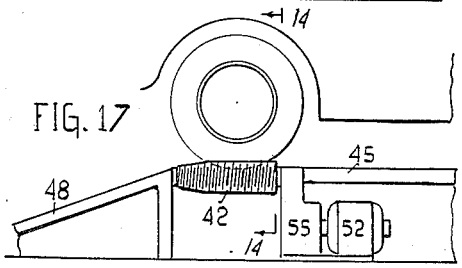
INVENTOR.
BY Max R. Zechlin
ATTORNEY.

Oct. 30, 1934.   M. R. ZECHLIN   1,978,927
BRAKE TESTING APPARATUS
Filed May 25, 1931   6 Sheets-Sheet 6

INVENTOR.
Max R. Zechlin
ATTORNEY

Patented Oct. 30, 1934

1,978,927

UNITED STATES PATENT OFFICE 1,978,927

BRAKE TESTING APPARATUS

Max Rudolf Zechlin, Dearborn, Mich.

Application May 25, 1931, Serial No. 539,826

7 Claims. (Cl. 265—25)

This invention relates to improvements in brake testing apparatus for testing and adjusting brakes on automotive and other vehicles.

It is an object of this invention to provide one or more worms for the rotation of the wheels, either before or after it is locked by the brake. Another object of the invention is to make the worm or worms conically tapered in order to raise the wheel clear from the ground. Another inventive object is to provide the worms with a thread that is particularly fitted to raise and to revolve the wheel, and to shape the thread in such a way, especially at its smaller end, that it grips the tire and raises it. A further object of this invention is seen in the direct action of the tire or wheel on the indicating device, eliminating leverage and its inaccuracies and establishing simplicity of construction.

The principle of the worm drive, whereby the tire of the wheel acts as a worm gear, can be applied as well to stationary as to portable brake testers, the worm being shaped either cylindrically or conically or conically in one part and cylindrically in its remainder part.

The advantage of a worm drive for brake testing machines over roller drives of the usual brake tester type is seen in the following facts:

1. It lends simplicity and strength to the machine, allowing a smaller gear reduction from the power source to the worm driver, because the latter has to revolve faster in comparison with the conventional roller driver in order to rotate the wheel with the same speed as the roller did, and because it eliminates a special lifting mechanism for raising the wheel clear from the ground with portable brake testers.

2. It eliminates the wheel base adjusting, hand operated mechanism with stationary brake testers and replaces it by a simple automatically operated tread adjusting mechanism.

3. It is less liable to slippage between driver and tire due to the consideration that, with the existent roller drivers each inch circumferential travel of the tire corresponds to one inch circumferential travel of the corrugations provided on the driver rollers for the revolving of the wheel. Whereas, with worm drivers, each inch of circumferential travel of the tire corresponds to one circular lead of the worm. The latter, f. i. having a diameter of 4", its circumferential lead would be 4×3.14=12.56". It is, however, evident, that the faster the corrugation revolves the more it is liable to slip on the rubber tire. As the corrugation of the worm, viz. its thread travels 12.56" on the tire, while the latter is traveling one inch, its relative circumferential speed to that of the tire only is 1: 12.56 of that of an equivalent roller driver.

It is another object of the present invention to provide in a brake testing apparatus of this class a mechanism which may be brought into engagement with the vehicle wheel and have force applied thereto in such a manner as to tend to move the vehicle wheel longitudinally of the mechanism and in which the reaction of the force tending to effect this movement will be directed to the vehicle wheel in such a manner as to tend to rotate the same, Another object of the invention is the provision in a mechanism of this class of a resistance member resisting the longitudinal movement of the wheel relatively to the member which is contacting therewith so that the thrust resistance may be indicated, thus indicating the force necessary to rotate the wheel and consequently its torque resistance, since the reactive force of the thrust force is directed to the vehicle wheel in a direction tending to rotate the same.

With these and other objects and advantages in view which will become apparent as the specification proceeds, the invention is hereinafter more fully described with the aid of the accompanying drawings, in which:

Fig. 1 illustrates an elevation, partly in section, of a portable brake tester with conical worms on the line 1—1 of Fig. 2;

Fig. 2 is a plan view of the same, seen from below, on the line 2—2 of Fig. 1;

Fig. 6 is one half of an end view, seen from the right side;

Fig. 7 is a cross section of the right hand end, on the line 7—7 of Fig. 1;

Fig. 8 is an enlarged view, partly in section, of the smaller end of the worm;

Fig. 9 is an enlarged cross section thereof, on the line 9—9 of Fig. 8, showing the profile of the worm-end, before it is threaded;

Fig. 10 is a diagrammatical plan view of a stationary brake tester with cylindrical worms;

Fig. 11 is a diagrammatic end view of the worm arrangement thereof;

Figure 5:
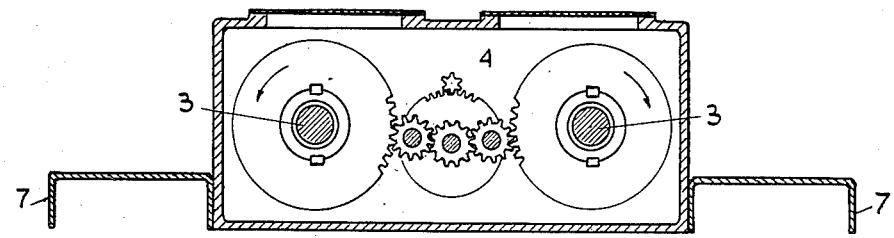
Fig. 5 is a cross section on the line 5—5 of Fig. 1.
Figure 4:
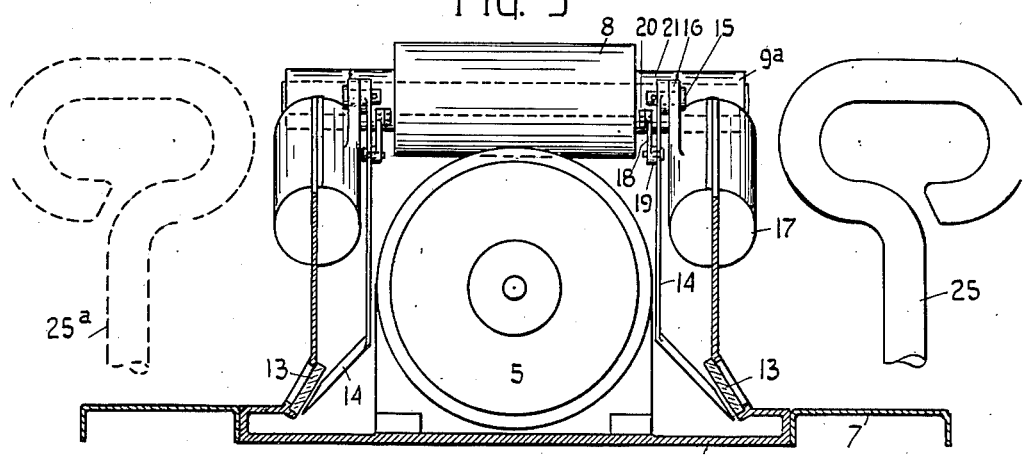
Fig. 4 is a cross section, on the line 4—4 of Fig. 1.
Figure 3:
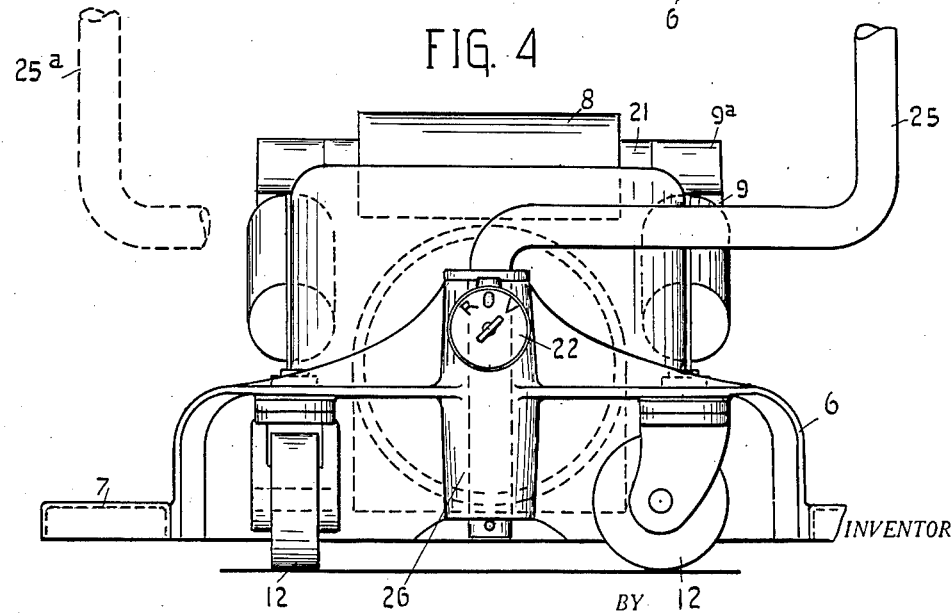
Fig. 3 is an end view thereof, seen from the left side.

means the forward, "R" the reverse and "O" the neutral position of the switch.

As there is a considerable thrust at the worm end 32 as a reaction to the brake resistance, a thrust bearing 33 has been provided, (Figs. 2 and 8).

It has to be emphasized that the conical shape of the worms is not only demanded by the wheel lifting operation, but also by the fact that, while lifting the brake locked wheel more power is required (viz: lifting the wheel plus revolving it) than for the measuring of the brake resistance alone after the lifting has been done. This greater power, automatically, is provided for by the smaller circumference of the worm at its smaller end 32, which results in a smaller lever for the lifting operation and in a smaller circumferential speed of this worm end 32, which means less power. Moreover the conical worms, as arranged in this instance, allow the use of the apparatus for tires of different sizes (thickness) due to the tapered space between the two worms, if seen in the plan view.

Because the tires have to act as worm gears they must mesh with the worms, for this reason the shape or profile of the thread on the worms has to be made suitable as well to old worn off tires with smooth surface as to new tires with projecting parts. In both cases a non-symmetric profile of the thread, as shown in Figs. 1, 2 and 8 with sharp corners 2A will be the preferred shape.

For stationary brake testers of the usual stage or platform type, like the Cowdrey brake tester, the application of worms instead of rollers has the advantage that the longer worms take care of cars with longer or shorter wheel bases without the necessity for providing adjustable sets of rollers for various wheel bases, as at present, with the common roller type brake tester for four wheels.

Figs. 10 to 17, diagrammatically show stationary four wheel brake testing apparatus of this known type in various views in combination with worm drives.

In Figs. 10, 11 and 12 cylindrical worms 40 in Figs. 13, 14 and 15 conical worms 41, and in Figs. 16 and 17 worms 42 partly cylindrical partly conical, are shown mounted on a stage 43, 44 and 45 with ramps 46, 47 and 48, the worms being driven by motors 50, 51 and 52 through means of reduction gears 53, 54 and 55. The indicating device, not shown, may be any one of the conventional dynamometers or other indicators, and may also be operated by the thrust of the worm.

Fig. 18 illustrates diagrammatically the use of only one single worm 60 for each wheel, either on stationary or on portable brake testers. In this case lateral supporting piloting rollers 61 fastened to stationary brackets 62 have to be provided for.

Fig. 19 demonstrates diagrammatically a three worm brake tester combination meant for heavy duty dual wheels; 65 are the worms and 66 and 67 the twin tires.

In the instances of Figs. 18 and 19 either cylindrical or conical or combined cylindrical and conical worms may be used.

The advantage of conical worms for stationary brake testers becomes evident as soon as we consider the necessity to adjust the worm drives according to the tread or gauge (distance between right and left hand side wheel planes) of the cars which differs sometimes a couple of inches. For exact brake resistance measuring it is essential that each wheel of a car is supported by its pair of worms just in the center of the wheel revolving plane. Therefore the two sets of worm driver units of one side of the four wheel stationary brake tester must have the possibility to adjust themselves in a lateral direction at a small amount (couple of inches), due to the variety of the tread or gauge of the various types of cars.

This lateral adjustment can easily be performed by hand by means of some mechanical sliding device on which the driver units of one side are mounted. However in order to dispense with all manual performances, which cause loss of time and wages, an automatically working selfadjusting device as shown by Figs. 20 to 26 is to be preferred. These figures illustrate lateral movable worm driver units, to be used on one side of a four wheel or two wheel stationary brake tester. Their lateral travel amounts only to a couple of inches according to the greatest difference occurring in the tread or gauge of the cars, for which the apparatus is built.

Figure 21:
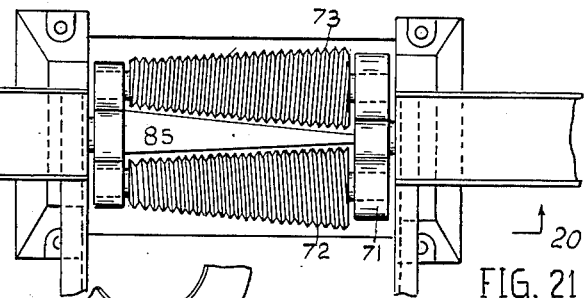
Figures 20, 22:
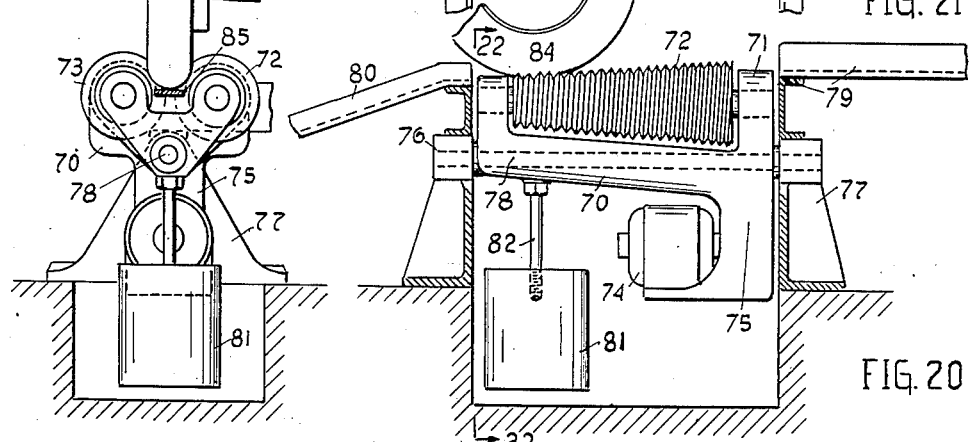

In the instance of Figs. 20 to 22 the worm driver unit is mounted on a separate frame or housing 70, in which the bearings 71 for worms 72 and 73 and their shafts are located. The latter are connected to the power source 74 by a reduction gear 75 (as shown in Figs. 1 and 2), covered by the housing 70. The latter is pivotally suspended on two brackets 76 and 77 by a shaft 78, which brackets form part of the stage 79 with ramp 80, upon which the car has to be driven for testing. The weight of the combined power source 74 and its reduction gear 75 as well as a separate counterweight 81, suspended on the frame 70 by a rod 82 are balancing the worm unit in such a way, that, when free, it maintains its center position as shown by Fig. 22. When loaded by the weight of the wheel, it either remains in this position in case the tread of the car is just the same as the distance between the center planes of the right and left hand driver units; or it slightly swings to the right or to the left according to a larger or smaller tread.

The width of the piloting rail of the ramp 80 is large enough to take care of the difference in the tread. While driving upon the platform the wheel 84 leaving the ramp 80, as demonstrated by Fig. 20, has ample space between the two conical worms to come in close contact with them either in their center line or more to the right or to the left, whereby it swings the movable unit out into such an angle, that, finally, the wheel is equally supported by both worms. A board 85 attached to the housing 70, prevents wheels with small tires dropping through the open space between the worms.

Figures 24, 26:
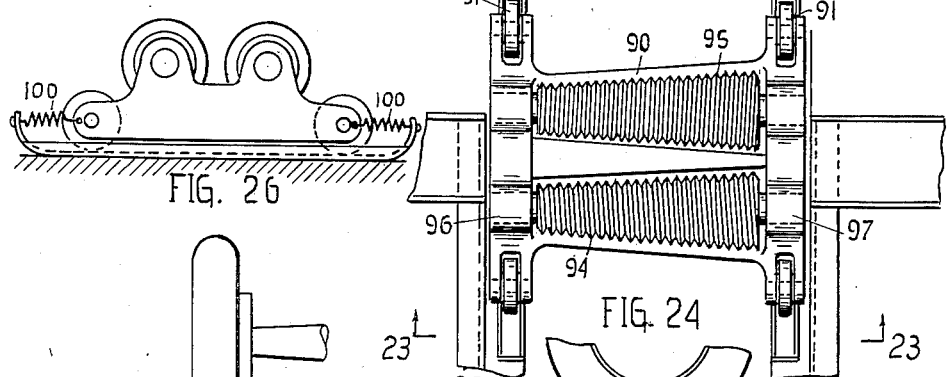
Figures 23, 25:
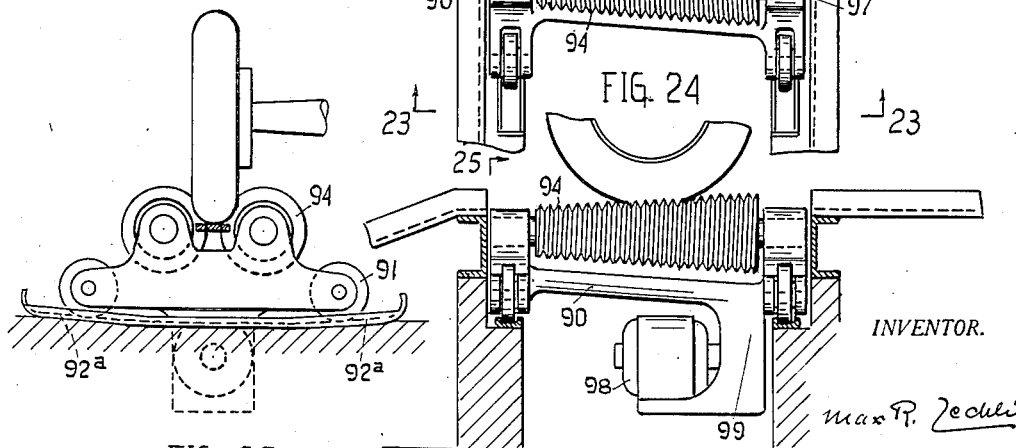

The same effect can be obtained by designing the housing for the two worm unit like a little four wheel carriage 90, laterally movable with rollers 91 on rails 92 and 93, as shown in Figs. 23 to 26. The driver worms 94 and 95 are supported in bearings 96 and 97 of the housing 90, and operated by a power source 98 and a reduction gear 99 enclosed in the housing 90. The lateral automatic adjustability is performed by providing a slight slope 92—a to the ends of the rails 92 and 93, as shown by Fig. 25, or by applying springs 100, as shown by Fig. 26. These means have the tendency to maintain the unit in its normal center position, but to allow it to move laterally as soon as the wheel, touching one of the two conical worms, pushes the carriage sideways.

Instead of plain conical worms, also the combined conical and cylindrical shape of worms, as shown by Fig. 16, may be used in this case.

It is thus evident that, whether the brake testing apparatus employs the construction shown in Fig. 1, Fig. 2, or Figs. 10 to 23 inclusive, there is engaged with the vehicle wheel, and it is believed evident that this engagement need not necessarily be limited to a peripheral engagement, a member to which force is applied, tending to move the member and the vehicle relatively to each other so that the vehicle wheel is moved longitudinally of the member, the wheel serving as the reactive body so that the reaction of the moving or thrust force directed to the member is transmitted to the vehicle wheel and this in a direction tending to rotate the vehicle wheel. The resistance member serves to resist the action of the force which is tending to thrust or move the rotatable member longitudinally relatively to the wheel so that the resistance recording mechanism will accurately record the thrust force when there is no longitudinal movement, and since there is an equal and opposite reaction to the thrust force, and it is this reactive force which effects the rotation of the vehicle wheel, it is evident that the thrust resistance will accurately indicate the rotative force and consequently the torque resistance.

Having thus described my invention, what I claim as new and desire to secure by Letters Patent is:

1. In a brake testing apparatus adapted for measuring the torque resistance of a rotatable wheel, an inclined member engageable tangentially with the periphery of said wheel; means for applying force to that tangent member for moving the same tangentially of said wheel, said member directing the reaction of said force to said wheel carried by the inclined member for effecting rotation of the same; yieldable means engageable with said wheel for resisting tangential movement of said inclined member relative to said wheel; and a mechanism for indicating the resisting force exerted by said resistance member.

2. A brake tester of the class described adapted for measuring the torque resistance of a rotatable vehicle wheel, comprising: an elongated rotatable inclined member engageable tangentially with the periphery of the wheel and adapted upon rotation for moving tangentially of the wheel; means for rotating said member; yieldable means for resisting tangential movement of said member, said member transmitting the reaction of said rotative force to said vehicle wheel in a direction for effecting rotation of the same; and a mechanism for indicating the resisting force exerted by said resistance member.

3. In a brake testing apparatus of the class described an inclined peripherally threaded elongated rotatable member engageable with the periphery of a vehicle wheel tangentially thereof, and adapted upon rotation for screwing itself tangentially of the wheel and effecting a movement of the wheel axially thereof; a yielding resistance member carried by said member, engageable with said wheel for resisting tangential movement of said member and rotating said wheel; means for rotating said member; and a mechanism for indicating the resisting force exerted by said resistance member.

4. In a brake testing apparatus adapted for measuring the torque resistance of a vehicle wheel, a rotatable peripherally threaded elongated member engageable with the periphery of said wheel and adapted upon rotation for effecting a relative movement of said wheel and said member axially of said member; yieldable means for resisting said axial movement; and means for indicating the resisting force exerted by the resistance means.

5. In a brake testing apparatus adapted for measuring the torque resistance of a rotatable wheel, a rotatable peripherally threaded elongated member engageable with said wheel and adapted upon rotation for effecting a relative movement of said wheel and said member axially of said member; yieldable means for resisting said axial movement; means for measuring said resistance and means for rotating said member, the reaction of the axial thrust delivered to said member being transmitted to said wheel in the opposite direction for tending to rotate the same.

6. In a brake testing apparatus adapted for measuring the torque resistance of a vehicle wheel, a rotatable peripherally threaded elongated member supporting said wheel, the rotation of said member transmitting through an axial thrust tending to effect bodily movement of said wheel axially of said member, the reaction of said thrust force being transmitted to said wheel in the direction opposite to the direction of said thrust and tending to rotate said wheel; yieldable means for resisting the movement of said wheel axially of said member; means for measuring the resisting force of the resistance means; and means for rotating said member.

7. A brake testing apparatus adapted for measuring the torque resistance of a rotatable wheel; a plurality of peripherally threaded rotatable wheel engaging members arranged in spaced sets for engaging the different wheels of a vehicle; means for rotating said members for effecting axial travel thereon of the vehicle wheel; means for resisting said axial travel and for rotating said wheel; and means for measuring the resisting force of said resistance means.

MAX RUDOLF ZECHLIN.

Oct. 30, 1934. H. L. BLUM 1,978,928
METHOD AND APPARATUS FOR TREATING LIQUIDS
Filed July 29, 1932 2 Sheets-Sheet 1
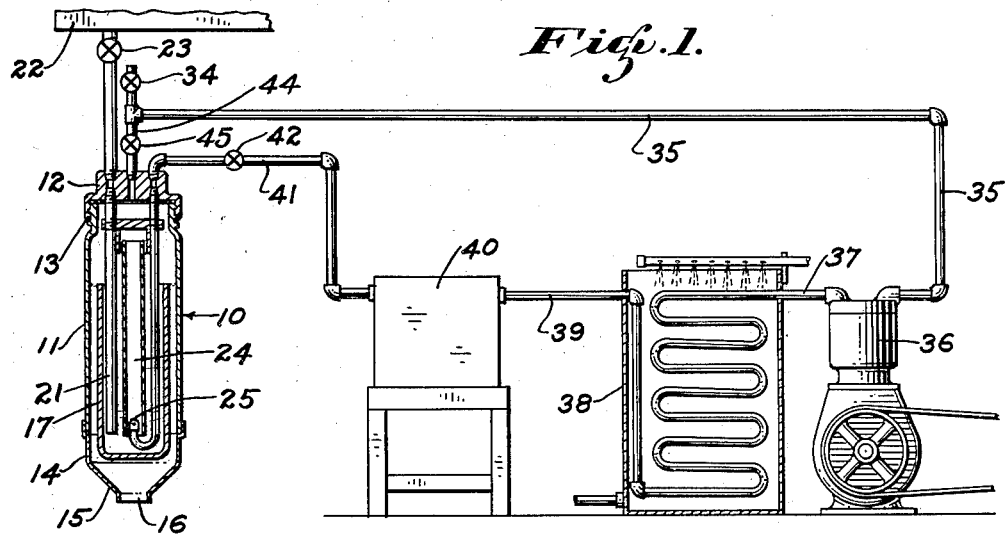
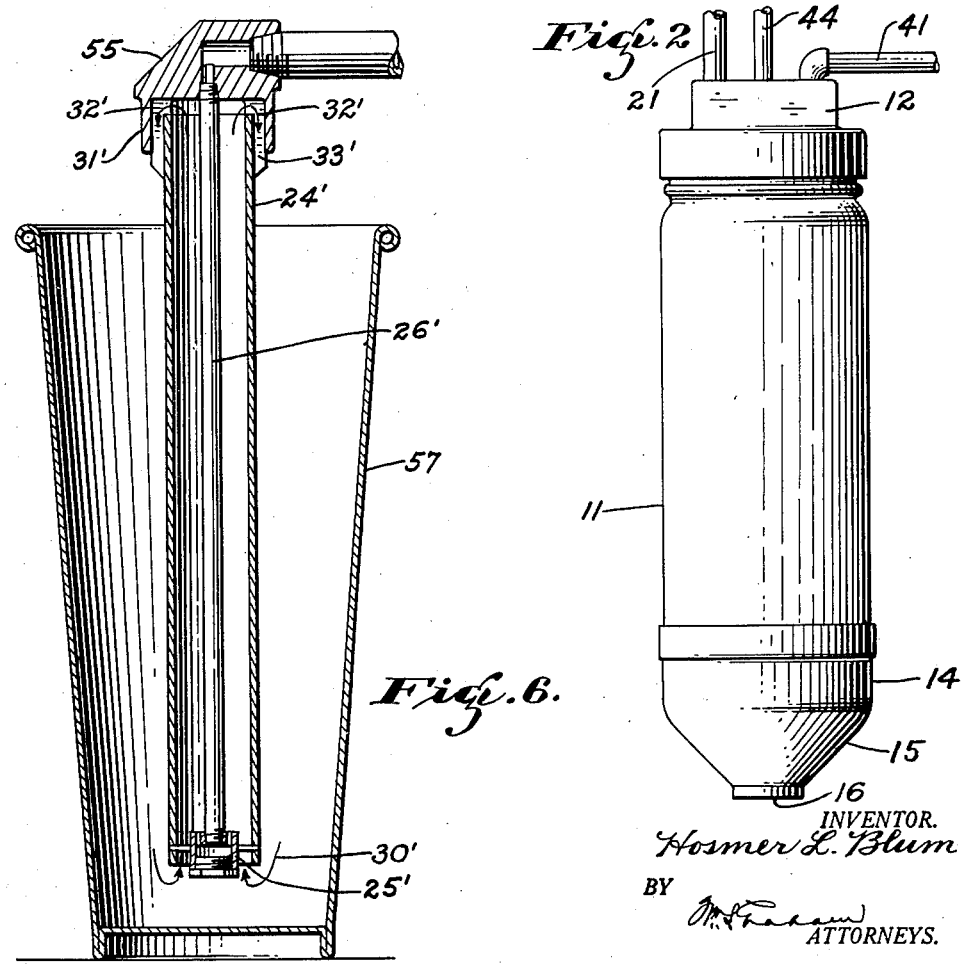
INVENTOR.
Hosmer L. Blum
BY
ATTORNEYS.